United States Patent
Chiu et al.

(10) Patent No.: US 11,172,303 B2
(45) Date of Patent: Nov. 9, 2021

(54) AUDIO CONCEALMENT METHOD AND WIRELESS AUDIO OUTPUT DEVICE USING THE SAME

(71) Applicant: Airoha Technology Corp., Hsinchu (TW)

(72) Inventors: Sheng-Yu Chiu, Hsinchu (TW); Kai-Sheng Chen, New Taipei (TW); Hsi-Yuan Tsai, Zhubei (TW); Chih-Kang Wang, Taichung (TW)

(73) Assignee: AIROHA TECHNOLOGY CORP., Hsinchu (TW)

(*) Notice: Subject to any disclaimer, the term of this patent is extended or adjusted under 35 U.S.C. 154(b) by 0 days.

(21) Appl. No.: 16/925,470

(22) Filed: Jul. 10, 2020

(65) Prior Publication Data

US 2021/0014616 A1  Jan. 14, 2021

Related U.S. Application Data

(60) Provisional application No. 62/873,204, filed on Jul. 12, 2019.

(30) Foreign Application Priority Data

Apr. 30, 2020 (TW) ................. 109114572

(51) Int. Cl.
*H04R 5/04* (2006.01)
*H04L 12/18* (2006.01)
(Continued)

(52) U.S. Cl.
CPC ............... *H04R 5/04* (2013.01); *H04L 12/18* (2013.01); *H04W 76/15* (2018.02); *H04W 76/18* (2018.02); *H04R 2420/07* (2013.01)

(58) Field of Classification Search
CPC ....... H04L 12/18; H04R 5/04; H04R 2420/07; H04W 76/15; H04W 76/18
(Continued)

(56) References Cited

U.S. PATENT DOCUMENTS

| 7,130,316 B2 | 10/2006 | Kovacevic |
|---|---|---|
| 8,180,078 B2 | 5/2012 | Zellner |

(Continued)

FOREIGN PATENT DOCUMENTS

| CN | 109995479 A | 7/2019 |
|---|---|---|
| TW | 201613376 A | 4/2016 |
| WO | 2016041445 A1 | 3/2016 |

OTHER PUBLICATIONS

TW Office Action dated Sep. 30, 2020 in Taiwan application (No. 109114572).

*Primary Examiner* — Hemant S Patel
(74) *Attorney, Agent, or Firm* — McClure, Qualey & Rodack, LLP

(57) ABSTRACT

A wireless audio output device including a first audio output unit and a second audio output unit is provided. The wireless audio output device establishes a wireless link with an audio source, which outputs a first original audio data and a second original audio data. The first and the second audio output units simultaneously output and play the first and the second original audio data. When the first audio output unit successfully receives the first original audio data but the second audio output unit fails to receive the second original audio data, the first audio output unit drops the received first original audio data, and the first and the second audio output units generate a first concealment audio data and a second concealment audio data, respectively, by using a PLC algorithm and play the first concealment audio data and the second concealment audio data, respectively.

19 Claims, 13 Drawing Sheets

(51) Int. Cl.
*H04W 76/18* (2018.01)
*H04W 76/15* (2018.01)

(58) Field of Classification Search
USPC .......................................................... 700/94
See application file for complete search history.

(56) References Cited

U.S. PATENT DOCUMENTS

| | | |
|---|---|---|
| 8,300,864 B2 | 10/2012 | Mullenborn et al. |
| 9,002,044 B2 | 4/2015 | Dinescu et al. |
| 9,641,945 B2 | 5/2017 | Chen et al. |
| 10,020,023 B2 | 7/2018 | Zeng et al. |
| 2012/0058727 A1* | 3/2012 | Cook ....................... H04R 3/00 |
| | | 455/41.3 |
| 2012/0099594 A1* | 4/2012 | Lau ....................... H04N 21/443 |
| | | 370/392 |
| 2013/0266152 A1 | 10/2013 | Haynie et al. |
| 2019/0230459 A1* | 7/2019 | Sridharan .............. H04R 5/033 |

\* cited by examiner

AUDIO CONCEALMENT METHOD AND WIRELESS AUDIO OUTPUT DEVICE USING THE SAME This application claims the benefit of U.S. provisional application Ser. No. 62/873,204, filed Jul. 12, 2019, and Taiwan application Serial No. 109114572, filed Apr. 30, 2020, the subject matters of which are incorporated herein by reference.

BACKGROUND OF THE DISCLOSURE

Field of the Disclosure

The disclosure relates in general to an audio concealment method and the wireless audio output device using the same.

Description of the Related Art

Portable and wearable electronic devices, such as mobile phone, tablet PC, Walkman, and smart watch, have become more and more popular. Of the peripheral devices of the portable and wearable electronic devices, an audio output device plays an important role. Normally, a portable audio output device includes a headphone and a speaker. To increase portability of the portable and wearable electronic devices and dispense with wired headphone jack, wireless transmission of audio data between the audio output device and an audio source is an inevitable trend.

SUMMARY OF THE DISCLOSURE

According to one embodiment of the present disclosure, a wireless audio output device capable of creating a wireless signal link with an audio source is provided. The audio source outputs a first original audio data and a second original audio data which are set to be outputted simultaneously. The wireless audio output device includes a first audio output unit and a second audio output unit. The first audio output unit is configured to receive and play the first original audio data over a wireless signal link. The second audio output unit is configured to receive and play the second original audio data over the wireless signal link. The first audio output unit and the second audio output unit determine whether the first original audio data and the second original audio data are successfully received, respectively, and the first audio output unit and the second audio output unit exchange the results of determination. When the first original audio data and the second original audio data both are successfully received, the first audio output unit and the second audio output unit decode and output the first original audio data and the second original audio data, respectively. When at least one of condition (1) that the first original audio data cannot be successfully received by the first audio output unit and condition (2) that the second original audio data cannot be successfully received by the second audio output unit is met, the first audio output unit and the second audio output unit generate a first concealment audio data and a second concealment audio data, respectively, by using a PLC algorithm. The first audio output unit and the second audio output unit play the first concealment audio data and the second concealment audio data, respectively.

According to another embodiment of the present disclosure, an audio concealment method adaptable to a wireless audio output device is provided. The audio concealment method includes the following steps. (a) When a first original audio data is successfully received by a first audio output unit of the wireless audio output device and a second original audio data is successfully received by a second audio output unit of the wireless audio output device, the first audio output unit and the second audio output unit play the first original audio data and the second original audio data, respectively. The first original audio data and the second original audio data are outputted from an audio source. The wireless audio output device is configured to establish a wireless signal link with the audio source. The first original audio data and the second original audio data are set to be outputted simultaneously. The first audio output unit is configured to receive and play the first original audio data over the wireless signal link, and the second audio output unit is configured to receive and play the second original audio data over the wireless signal link. The first audio output unit and the second audio output unit determine whether the first original audio data and the second original audio data are successfully received, respectively, and the first audio output unit and the second audio output unit exchange the results of determination. (b) When at least one of a first condition that the first original audio data cannot be successfully received by the first audio output unit and a second condition that the second original audio data cannot be successfully received by the second audio output unit is met, the first audio output unit and the second audio output unit generate a first concealment audio data and a second concealment audio data, respectively, by using a PLC algorithm and play the first concealment audio data and the second concealment audio data, respectively.

The above and other aspects of the disclosure will become better understood with regard to the following detailed description of the preferred but non-limiting embodiment (s). The following description is made with reference to the accompanying drawings.

DETAILED DESCRIPTION OF THE DISCLOSURE

Figure 1:
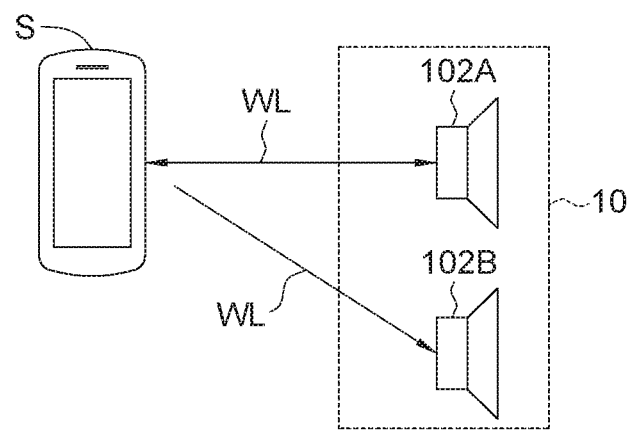
FIG. 1 is a schematic diagram of a conventional wireless audio output device.

Referring to FIG. 1, a schematic diagram of a generally available wireless audio output device 10 is shown. The wireless audio output device 10 includes a first audio output unit 102A and a second audio output unit 102B. The wireless audio output device 10 can establish a wireless signal link WL with an audio source S (such as a mobile phone), which outputs a first original audio data OA1 (such as a left-channel audio data) and a second original audio data OA2 (such as a right-channel audio data). The wireless audio output device 10, for example, is a Bluetooth wireless headphone, and the first audio output unit 102A and the second audio output unit 102B are the left-channel output and the right-channel output of the Bluetooth wireless headphone, respectively. The first original audio data OA1 and the second original audio data OA2 are outputted through the first audio output unit 102A and the second audio output unit 102B, respectively, to a user for listening, and are set to be outputted simultaneously.

In a speech scenario, the talker's voice normally is not stereo sound which makes difference between a left channel and a right channel, and therefore the first original audio data OA1 and the second original audio data OA2 (a left-channel audio data and a right-channel audio data) outputted from the mobile phone signal source S are basically identical. As such, when the first audio output unit 102A (a left-ear headphone) and the second audio output unit 102B (a right-ear headphone) successfully receive the first original audio data OA1 and the second original audio data OA2, respectively, a voice received by a listener through the left-ear headphone and a voice received by the listener through the right-ear headphone are nearly identical. As a result, the listener will have a better subjective auditory perception.

For convenience of description, codes used in the disclosure are defined as follows: for a code "OAxy", the prefix "OA" represents an original audio data outputted from an audio source S; x represents a relevant audio output unit number; and, y represents a serial number of a predetermined output time. Similarly, for a code "CAxy", the prefix "CA" represents a concealment audio data; x represents a relevant audio output unit number; and, y represents a serial number of a predetermined output time. For example; a code "OA23" represents the original audio data set to be outputted by the second audio output unit 102B at a time point t3; and, a code "CA14" represents a concealment audio data set to be outputted by the first audio output unit 102A at a time point t4. The concealment audio data normally is a substitute audio data generated using a packet loss concealment (PLC) algorithm. The PLC algorithm constructs the concealment audio data based on a periodic signal corresponding to a vocal fundamental frequency of the previous few original audio data successfully received by the wireless audio output device 10.

Figure 2:
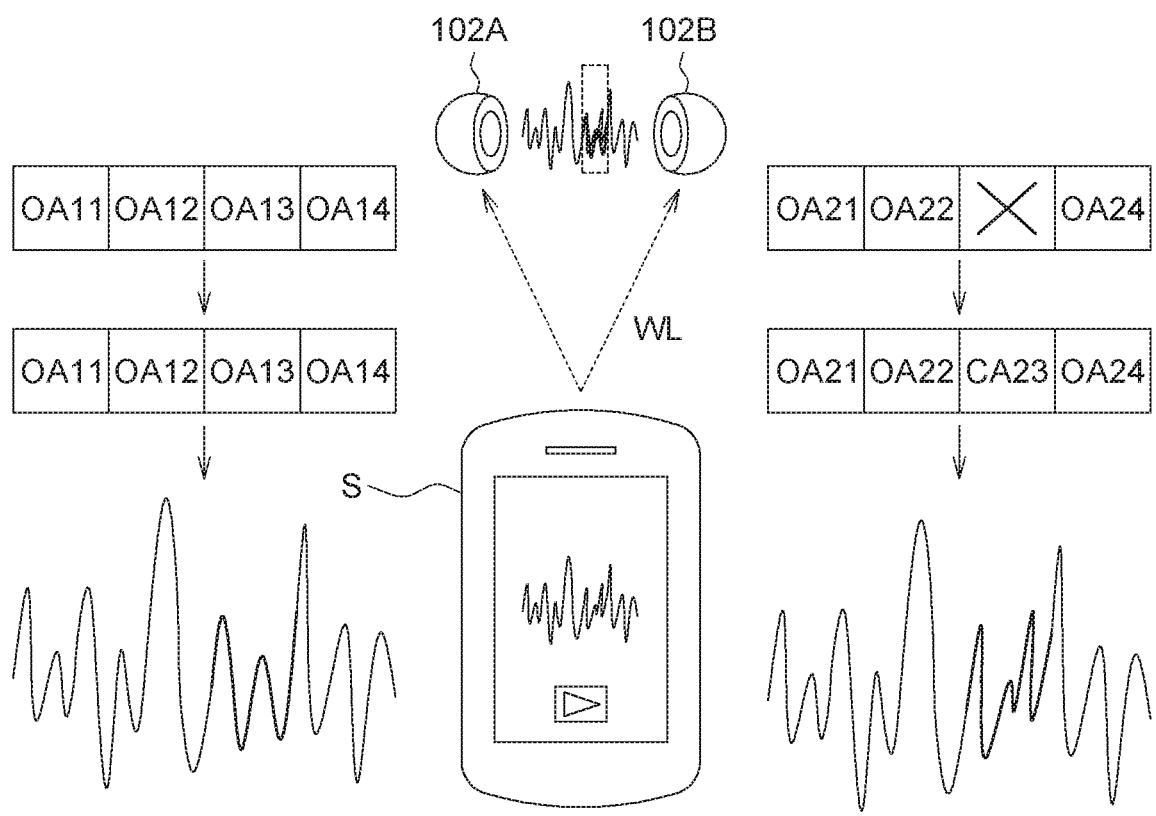
FIG. 2 is a schematic diagram of the waveforms in a conventional wireless audio output device when one audio output unit fails to receive the packets and the waveforms outputted from two audio output units are inconsistent.

Referring to FIG. 2, a scenario of packet loss, which would possibly occur during wireless transmission of audio data, is shown. Original audio data set to be outputted at time points t1 to t4 are indicated at the top left of FIG. 2. As shown in a first row of the top left of FIG. 2, four packets including original audio data OA11 to OA14 are received by the first audio output unit 102A successfully. As shown in a second row of the top left of FIG. 2, the first audio output unit 102A will output the received first original audio data OA11 to OA14 at time points t1 to t4, respectively. On the other hand, as shown in a first row of the top right of FIG. 2, the second audio output unit 102B successfully receives only three packets including original audio data OA21 to OA22 and OA24, but fails to receive the third packet including an original audio data OA23 That is, the second audio output unit 102B only obtains a partial of a second original audio data, namely, OA21 to OA22 and OA24, but lacks the second original audio data OA23, which is set to be outputted by the second audio output unit 102B at the time point t3.

According to a possible remedy taken by generally available products, the second audio output unit 102B will generate a concealment audio data CA23 by using a PLC algorithm. The second audio output unit 102B uses the concealment audio data CA23 as a substitute audio data for the missing packet at the time point t3 for outputting an audio data. As shown in a second row of the top right of FIG. 2, the second audio output unit 102B outputs the second original audio data OA21 to OA22, the concealment audio data CA23 and the second original audio data OA24 at time points t1 to t4, respectively. At the time point t3, the first audio output unit 102A outputs the first original audio data OA13 included in the third packet, while the second audio output unit 102B outputs the concealment audio data CA23.

At the time point t3, if a vocal fundamental frequency varies greatly, then, as indicated in the bottom left and the bottom right of FIG. 2, there is a significant difference between a first waveform and a second waveform. The first waveform is generated according to the original audio data OA13, and the second waveform is generated by replacing the missing audio data with the concealment audio data CA23 generated using the PLC algorithm. Such significant difference results in a significant imbalance between a left-ear audio and a right-ear audio. The imbalance is noticeable to a user at the time point t3. Further, the imbalance may further become a noise to the user and deteriorate the user's subjective auditory perception.

Figure 3:
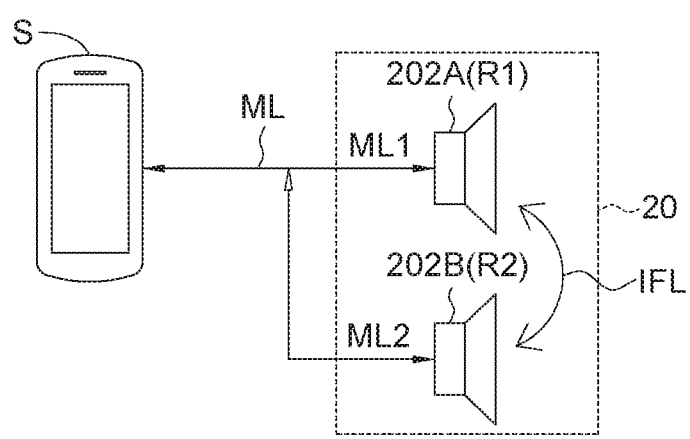
FIG. 3 is a diagram of a wireless audio output device used in an audio source according to an embodiment of the present disclosure.

Referring to FIG. 3, a diagram of a wireless audio output device 20 according to an embodiment of the present disclosure is shown. The wireless audio output device 20 can establish a wireless signal link ML with an audio source S. The audio source S outputs a first original audio data OA1x and a second original audio data OA2x, which are set to be outputted simultaneously at time point tx to a user for listening. The wireless audio output device 20 includes a first audio output unit 202A and a second audio output unit 202B. The wireless signal link ML includes a bi-directional link ML1 and a unidirectional link ML2. The first audio output unit 202A and the audio source S establish a bi-directional link ML1, over which the first audio output unit 202A can receive and play the first original audio data OA1x. The second audio output unit 202B and the audio source S establish a unidirectional link ML2, over which the second audio output unit 202B can receive and play the second original audio data OA2x. Since a link between the first audio output unit 202A and the audio source S is the bi-directional link ML1 and since a link between the second audio output unit 202B and the audio source S is the unidirectional link ML2, the first audio output unit 202A is set as a primary communication unit R1, and the second audio output unit 202B is set as a secondary communication unit R2. During an extended packet time, the first audio output unit 202A and the second audio output unit 202B further establish a wireless signal link IFL. The first audio output unit 202A functions to determine whether the first original audio data OA1x is successfully received. Also, the second audio output unit 202B functions to determine whether the second original audio data OA2x is successfully received. Further, the determinations are exchanged between the first and second audio output units 202A and 202B over the wireless signal link IFL. In further detail, the first audio output unit 202A provides the determination in relation to reception of the first original audio data OA1x to the second audio output unit 202B, and receives the determination in relation to reception of the second original audio data OA2x from the second audio output unit 202B. The second audio output unit 202B operates as the first audio output unit 202A, and therefore the detailed description is omitted herein for brevity. In some embodiments, the first audio output unit 202A detects whether the second original audio data OA2x is successfully received, and the second audio output unit 202B detects whether the first original audio data OA1x is successfully received. When at least one of condition (1) that the first original audio data OA1x cannot be successfully received by the first audio output unit 202A and condition (2) that the second original audio data OA2x cannot be successfully received by the second audio output unit 202B is met, the first audio output unit 202A and the second audio output unit 202B generate a first concealment audio data CA1x and a second concealment audio data CA2x, respectively, by using a PLC algorithm, and then play the first concealment audio data CA1x and the second concealment audio data CA2x, respectively.

According to another embodiment of the disclosure, an audio concealment method adaptable to the wireless audio output device 20 of FIG. 3 is provided. The audio concealment method includes a first step (a) and a second step (b). In the first step (a), when the first original audio data OA1x and the second original audio data OA2x are successfully received by the first audio output unit 202A and the second audio output unit 202B of the wireless audio output device 20, respectively, the first audio output unit 202A and the second audio output unit 202B play the first original audio data OA1x and the second original audio data OA2x respectively, wherein the first original audio data OA1x and the second original audio data OA2x are outputted from the audio source S. The wireless audio output device 20 establishes a wireless signal link ML with the audio source S. The first original audio data OA1x and the second original audio data OA2x are set to be outputted simultaneously. The first audio output unit 202A is configured to receive and play the first original audio data OA1x over the wireless signal link ML, and the second audio output unit 202B is configured to receive and play the second original audio data OA2x over the wireless signal link ML. The first audio output unit 202A functions to determine whether the first original audio data OA1x is successfully received. Also, the second audio output unit 202B functions to determine whether the second original audio data OA2x is successfully received. Further, the determinations are exchanged between the first and second audio output units 202A and 202B over the wireless signal link ML. In the second step (b), when at least one of condition (1) that the first original audio data OA1x cannot be successfully received by the first audio output unit 202A and condition (2) that the second original audio data OA2x cannot be successfully received by the second audio output unit 202B is met, the first audio output unit 202A and the second audio output unit 202B generate a first concealment audio data CA1x and a second concealment audio data CA2x, respectively, by using a PLC algorithm. The first audio output unit 202A and the second audio output unit 202B play the first concealment audio data CA1x and the second concealment audio data CA2x, respectively.

Figure 4:
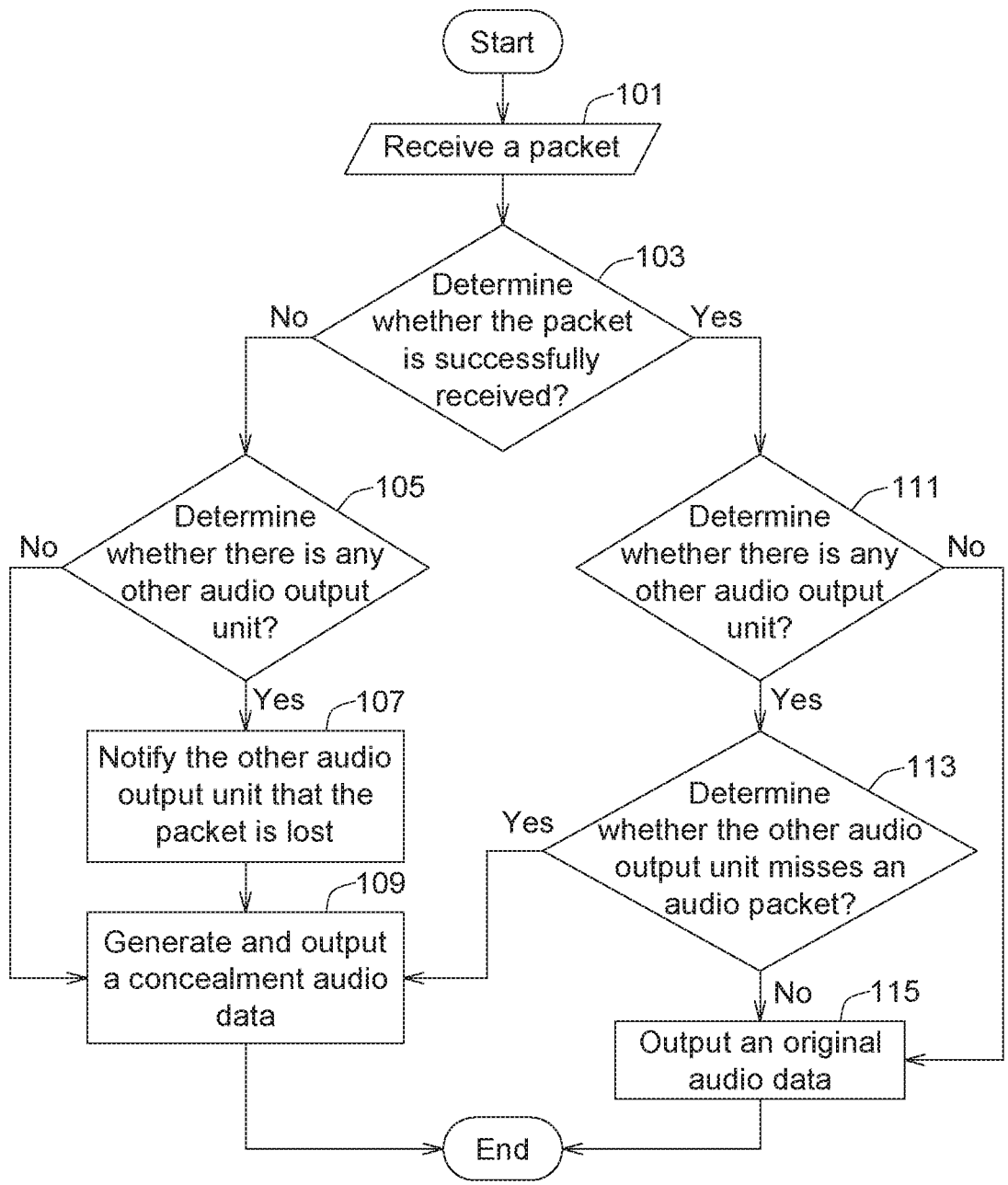
FIG. 4 is a flowchart of a synchronous dropping mechanism operated by two audio output units of FIG. 3 according to an embodiment of the present disclosure.

Referring to FIG. 4, a flowchart of an example of an audio concealment method according to an embodiment of the present disclosure is shown. In the present embodiment, a wireless audio output device is provided with two audio output units 202A to 202B, and both audio output units 202A and 202B operate according to the audio concealment method shown in FIG. 4.

The present embodiment is exemplified by the first audio output unit 202A operating the method of FIG. 4. The method of FIG. 4 includes steps 101, 103, 105, 107, 109, 111, 113 and 115.

In step 101, a packet including an original audio data OA1x is received by a first audio output unit 202A. The packet is sent from an audio source S. The original audio data OA1x is set to be outputted by the first audio output unit 202A at a time point tx. Then, the method proceeds to step 103, by means of the first audio output unit 202A, it is determined whether the packet from the audio source S is successfully received. If yes, the method proceeds to step 111; otherwise, the method proceeds to step 105. In step 105, whether the wireless audio output device 20 is provided with other audio output unit(s) is determined by the first audio output unit 202A. For example, it is determined whether the second audio output unit 202B is present by determining whether any other audio output unit for receiving the audio data packet from the audio source S is present. If yes, the method proceeds to step 107; otherwise, the method proceeds to step 109. In step 107, the other audio output unit is notified of packet loss by the first audio output unit 202A. For example, the first audio output unit 202A notifies the second audio output unit 202B via a message: "the first audio output unit 202A fails to receive the packet and misses the audio packet including the original audio data OA1x", In step 109, a concealment audio data CA1x is generated by the first audio output unit 202A by using a PLC algorithm, and a concealment audio waveform is outputted according to the concealment audio data CA1x at the time point tx. In step 111, whether the wireless audio output device 20 is provided with other audio output unit(s) is determined by the first audio output unit 202A. For example, it is determined whether the second audio output unit 202B is present by determining whether any other audio output unit for receiving the audio data packet from the audio source S is present, for example. If yes, the method proceeds to step 113; otherwise, the method proceeds to step 115. In step 113, whether the second audio output unit 202B misses an audio packet is determined by the first audio output unit 202A by exchanging message with the second audio output unit 202B or detecting the state of the second audio output unit 202B. If yes, the method proceeds to step 109; otherwise, the method proceeds to step 115. In step 115, an audio data is outputted by the first audio output unit 202A at the time point tx according to the received original audio data OA1x.

Similarly, the present embodiment is exemplified by the second audio output unit 202B operating the method of FIG. 4.

In step 101, a packet is received by a second audio output unit 202B. The packet is sent from an audio source S. The packet includes an original audio data OA2x. The original audio data OA2x is the original audio data which is set to be outputted by the second audio output unit 202B at the time point tx. Then, the method proceeds to step 103, by means of the second audio output unit 202B, it is determined whether the packet from the audio source S is successfully received. If yes, the method proceeds to step 111; otherwise, the method proceeds to step 105. In step 105, whether the wireless audio output device 20 is provided with other audio output unit(s) is determined by the second audio output unit 202B. For example, it is determined whether the first audio output unit 202A is present by determining whether any other audio output unit for receiving the audio data packet from the audio source S is present. If yes, the method proceeds to step 107; otherwise, the method proceeds to step 109. In step 107, the other audio output unit is notified that the packet is lost by the second audio output unit 202B. For example, the second audio output unit 202B notifies the first audio output unit 202A via a message: "the second audio output unit 202B fails to receive the packet and misses the audio packet including the original audio data OA2x". In step 109, a concealment audio data CA2x is generated by the second audio output unit 202B by using a PLC algorithm and a concealment audio waveform is outputted according to the concealment audio data CA2x at the time point tx by decoding the concealment audio data CA2x. In step 111; whether the wireless audio output device 20 is provided with other audio output unit(s) is determined by the second audio output unit 202B. For example, it is determined whether the first audio output unit 202A is present by determining whether any other audio output unit for receiving the audio data packet from the audio source S is present. If yes, the method proceeds to step 113; otherwise, the method proceeds to step 115. In step 113, whether the first audio output unit 202A misses an audio packet is determined by the second audio output unit 202B through exchanging message with the first audio output unit 202A or detecting the state of the first audio output unit 202A. If yes, the method proceeds to step 109; otherwise, the method proceeds to step 115. In step 115, an audio data is outputted by the second audio output unit 202B at the time point tx according to the received original audio data OA2x.

Through the above process, when the first audio output unit 202A fails to receive the packet and therefore lacks the original audio data OA1x set to be outputted at the time point tx, the second audio output unit 202B will drop the successfully received original audio data OA2x despite that the second audio output unit 202B has successfully received the packet and the second audio output unit 202B has already received the original audio data OA2x set to be outputted at time point tx. Both of the audio output units 202A to 202B obtain the concealment audio data CA1x and CA2x set to be outputted at time point tx by using a PLC algorithm.

Thus, when the first original audio data OA1x and the second original audio data OA2x both are successfully received, the first audio output unit 202A and the second audio output unit 202B output and play the first original audio data OA1x and the second original audio data OA2x at the time point tx, respectively. Conversely, when at least one of condition (1) that the first original audio data OA1x cannot be successfully received by the first audio output unit 202A and condition (2) that the second original audio data OA2x cannot be successfully received by the second audio output unit 202B is met, the first audio output unit 202A and the second audio output unit 202B generate a first concealment audio data CA1x and a second concealment audio data CA2x, respectively, by using the PLC algorithm, and output and play the first concealment audio data CA1x and the second concealment audio data CA2x at the time point tx, respectively.

Besides, when the wireless audio output device 20 is provided with at least two audio output units, steps 105 and 111 are optional in the above process, and the "Yes" branch and the "No" branch of step 103 are directly followed by step 113 and step 107, respectively.

Figure 5:
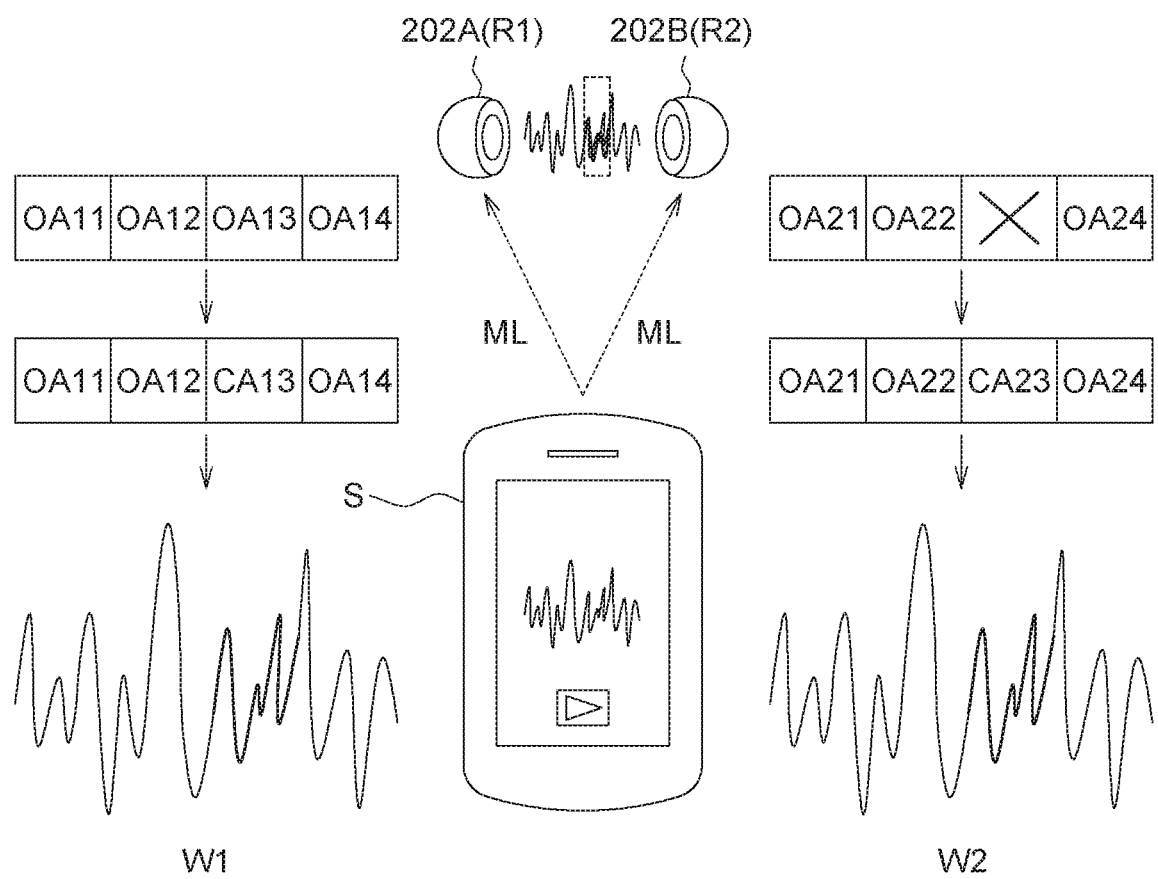
FIG. 5 is a schematic diagram of the waveforms outputted by two audio output units of FIG. 3 operating a synchronous dropping mechanism according to an embodiment of the present disclosure.

Referring to FIG. 5, a schematic diagram of the waveforms outputted by two audio output units operating a synchronous dropping mechanism according to an embodiment of the present disclosure is shown. In an event that one headphone successfully receives the packet but the other headphone fails to receive the packet as described in FIG. 2, when each audio output unit is provided with a synchronous dropping mechanism, waveforms outputted by a left-ear headphone and a right-ear headphone according to an embodiment of the present disclosure (referring to FIG. 5) are better than the waveforms outputted by the generally available products (referring to FIG. 2) in the market.

With regard to an original audio data set to be outputted at time points t1 to t4, as shown in a first row of the top left of FIG. 5, the first audio output unit 202A successfully receives four packets including the first original audio data OA11 to OA14. As shown in a first row of the top right of FIG. 5, the second audio output unit 202B only successfully receives three packets including the second original audio data OA21, OA22 and OA24 but fails to receive the third packet. The second audio output unit 202B only obtains a partial of a second original audio data, namely, OA21 to OA22 and OA24, but lacks the second original audio data OA23, which is set to be outputted by the second audio output unit 202B at the time point t3. According to the present disclosure, the first audio output unit 202A will drop the successfully received first original audio data OA13, and the first audio output unit 202A and the second audio output unit 202B will generate a first concealment audio data CA13 and a second concealment audio data CA23, respectively, by using the same PLC algorithm. Given that the first original audio data OA11, OA12 and OA14 are identical to the second original audio data OA21, OA22 and OA24, respectively, the first concealment audio data CA13 and the second concealment audio data CA23 generated by the first audio output unit 202A and the second audio output unit 202B, respectively, should be identical to each other.

As shown in a second row of the top left of FIG. 5, at time points t1 to t4, the first audio output unit 202A sequentially outputs "the first original audio data OA11 to OA12, the first concealment audio data CA13 and the first original audio data OA14" to obtain a first waveform W1 as indicated in the bottom left of FIG. 5. As shown in a second row of the top right of FIG. 5, the second audio output unit 202B sequentially outputs "the second original audio data OA21 to OA22, the second concealment audio data CA23 and the second original audio data OA24" to obtain a second waveform W2 as indicated in the bottom right of FIG. 5. Since the first waveform W1 and the second waveform W2 are similar to each other, the user's left ear and right ear cannot recognize the difference therebetween. Thus, the user's subjective auditory perception can be improved.

Figure 6:
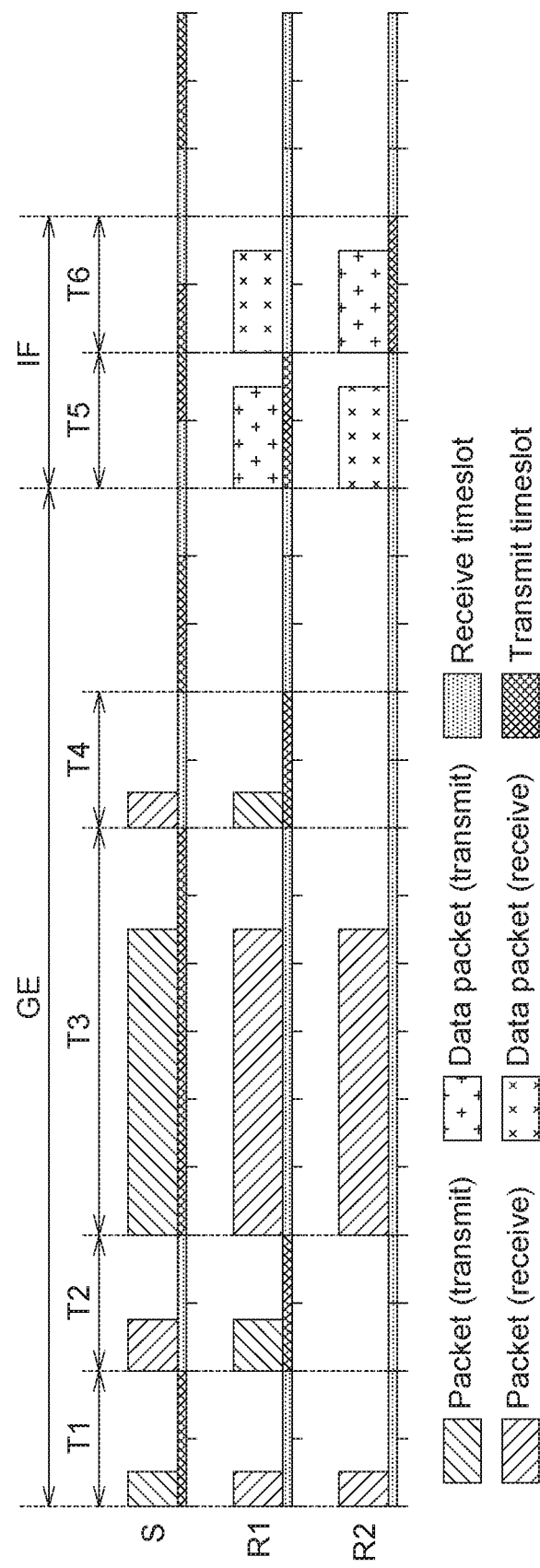
FIG. 6 is a timing diagram of the transmission and reception of the packets based on the Bluetooth protocol according to an embodiment of the present disclosure.

Referring to FIG. 6, a timing diagram of transmission and reception of packets based on the Bluetooth standard protocol according to an embodiment of FIG. 3 of the present disclosure is shown. In the present embodiment, the audio source S is a standard Bluetooth device. That is, the slot design of the audio source S is based on the standard Bluetooth protocol. The first audio output unit 202A is set as a primary communication unit R1, the second audio output unit 202B is set as a secondary communication unit R2, and the slot of each of the first audio output unit 202A and the second audio output unit 202B is extended according to the standard Bluetooth protocol. It is given that the wireless audio output device 20 and the audio source S are paired and establish a multicast link as a wireless signal link ML. For convenience, the symbol "ML" is also used to refer to the multicast link, if appropriate. That is, the wireless audio output device 20 and the audio source S can be regarded as a packet transmission system. The primary communication unit R1 is configured to establish the multicast link ML with the audio source S and perform bi-directional communication with the audio source S over the multicast link ML. The secondary communication unit R2 is configured to be added to the multicast link ML over which the secondary communication unit R2 performs unidirectional communication with the audio source S and performs bi-directional communication with the primary communication unit R1.

In terms of time domain, a time axis of the packet transmission system can be divided into two types of packet transmission time. That is, a standard packet time GE and an extended packet time IF. Within the standard packet time GE, the audio source S can transmit a control signal and an audio packet to the primary communication unit R1 and the secondary communication unit R2. The primary communication unit R1 can receive the control signal and the audio packet from the audio source S, and can transmit a reply to the audio source S in response to the received control signal and audio packet. The secondary communication unit R2 can receive a control signal and an audio packet from the audio source S. Within the extended packet time IF, the primary communication unit R1 and the secondary communication unit R2 can exchange one or multiple extended packets. Details of the extended packets are disclosed below.

For example, periods T1 and T3 are not only transmission slots (TX slots) of the audio source S but also reception slots (RX slots) of the primary communication unit R1 and the secondary communication unit R2. Periods T2 and T4 are RX slots of the audio source S and TX slots of the primary communication unit R1. In period T1, the audio source S transmits a control signal to the primary communication unit R1 and the secondary communication unit R2. In period T2, the primary communication unit R1, based on the control signal, transmits a reply to the audio source S. In period T3, the audio source S transmits an audio packet to the primary communication unit R1 and the secondary communication unit R2. In period T4, the primary communication unit R1, based on the audio packet, transmits a reply to the audio source S.

Period T5 is a TX slot of the primary communication unit R1 and an RX slot of the secondary communication unit R2. Period T6 is an RX slot of the primary communication unit R1 and a TX slot of the secondary communication unit R2. Therefore, in period T5, the primary communication unit R1 transmits an extended packet to the secondary communication unit R2. In period T6, the secondary communication unit R2 transmits an extended packet to the primary communication unit R1.

It should be noted that when the primary communication unit R1 and the secondary communication unit R2 exchange the extended packets, an initial time at which the extended packet is transmitted does not have to be aligned with an initial time of the RX slot of the audio source S. Therefore, the audio source S will not receive any extended packet from the primary communication unit R1 and the secondary communication unit R2, and is kept to follow the standard Bluetooth protocol. In other words, the wireless audio output device 20 can support the audio source S complying with the Bluetooth protocol.

Figure 7A:
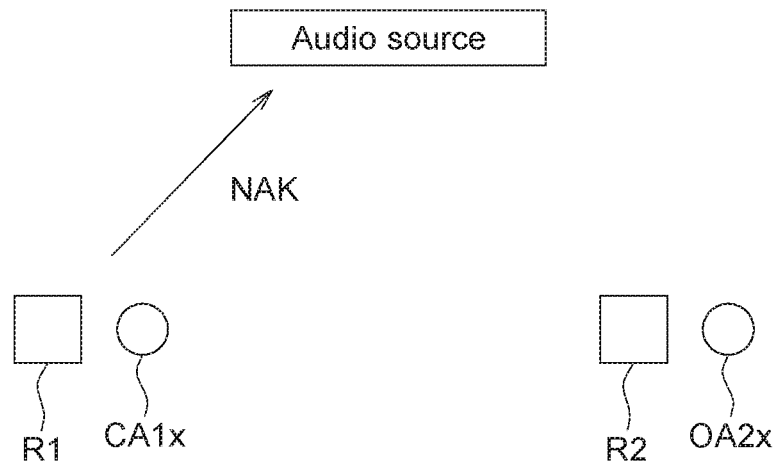
FIGS. 7A to 7B are schematic diagrams of the first scenario of the two audio output units of FIG. 6 operating a synchronous dropping mechanism according to an embodiment of the present disclosure.
Figure 7B:
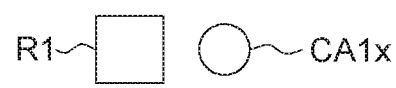
Figure 7B:
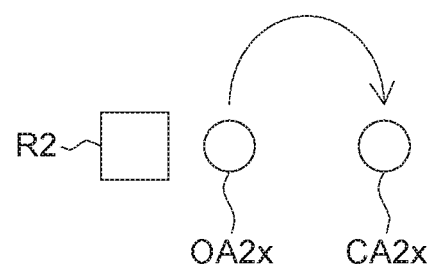

Referring to FIGS. 7A to 7B, schematic diagrams of the first scenario of the two audio output units of FIG. 6 operating a synchronous dropping mechanism according to an embodiment of the present disclosure are shown. FIG. 7A shows a scenario, in which (1) the audio source S cannot transmit the first original audio data $OA1x$ to the primary communication unit R1 over the multicast link ML and (2) the audio source S successfully transmits the second original audio data $OA2x$ to the secondary communication unit R2 over the multicast link ML. That is, the primary communication unit R1 fails to receive the packet including the first original audio data $OA1x$, and the secondary communication unit R2 successfully receives the packet including the second original audio data $OA2x$. FIG. 7B shows a scenario in which the primary communication unit R1 and the secondary communication unit R2 (the first audio output unit and the second audio output unit) operate a synchronous dropping mechanism.

Referring to FIG. 7A. In step (a), the primary communication unit R1 replies a non-acknowledge (NAK) message to the audio source S, and the secondary communication unit R2 detects the NAK message. Meanwhile, the primary communication unit R1 is set to output and play the first concealment audio data $CA1x$ at the time point tx. Referring to FIG. 7B. In step (b), the NAK message triggers the secondary communication unit R2 to drop the received second original audio data $OA2x$, and the secondary communication unit R2 outputs and plays the second concealment audio data $CA2x$ at the time point tx.

Figure 8:
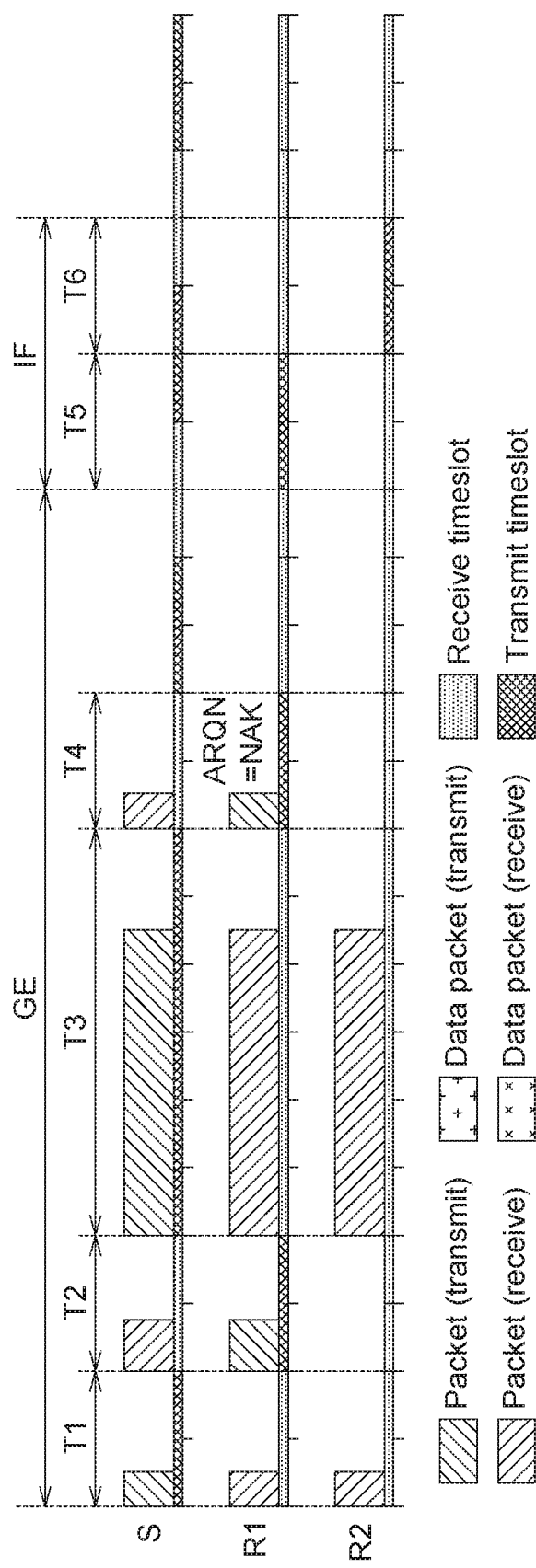
FIG. 8 is a timing diagram of the transmission and reception of packets between two audio output units of FIGS. 7A to 7B according to an embodiment of the present disclosure.

Referring to FIG. 8, a timing diagram of the transmission and reception of packets between the primary communication unit R1 and the secondary communication unit R2 as indicated in the scenarios of FIGS. 7A to 7B according to an embodiment of the present disclosure is shown. In the scenario of FIG. 7A, when the primary communication unit R1 (the first audio output unit) cannot successfully receive the first original audio data $OA1x$ from the audio source S over the multicast link ML, the primary communication unit R1 uses the flag message in period T4 of FIG. 6 as an NAK message and further replies the NAK message to the audio source S. Here, the flag message includes, but is not limited to, automatic request not (ARQN) message, for example. On the other hand, when the secondary communication unit R2 detects that the flag message includes the NAK message, the secondary communication unit R2 understands that the primary communication unit R1 fails to receive the first original audio data $OA1x$. Then, the secondary communication unit R2 is triggered to drop the second original audio data $OA2x$ as indicated in FIG. 7B.

Figure 9A:
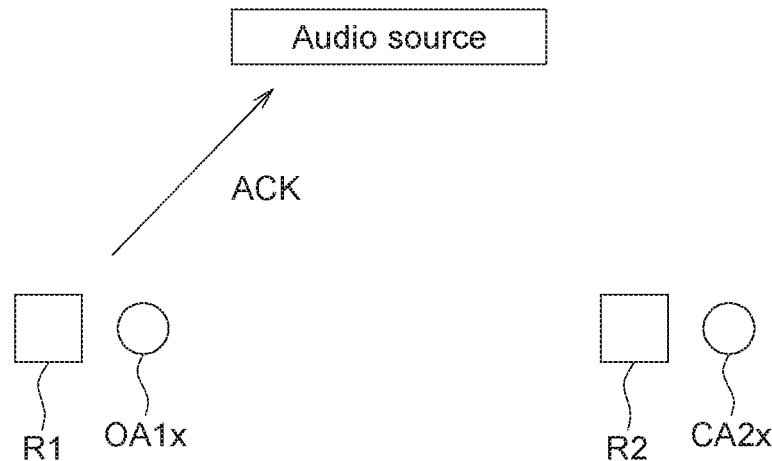
FIGS. 9A to 9C are schematic diagrams of the second scenario of the two audio output units of FIG. 6 operating a synchronous dropping mechanism according to an embodiment of the present disclosure.
Figure 9B:
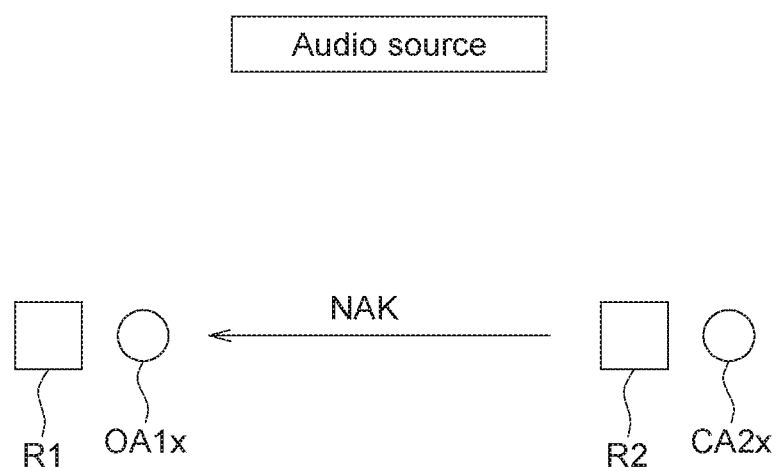
Figure 9C:
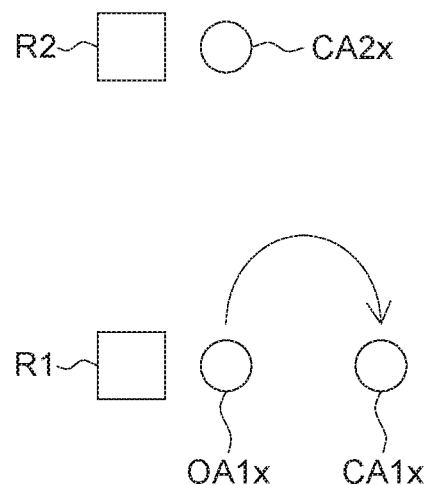

Referring to FIGS. 9A to 9C, schematic diagrams of the second scenario of the two audio output units of FIG. 6 operating a synchronous dropping mechanism according to an embodiment of the present disclosure are shown. According to the embodiment as indicated in FIG. 6, under the circumstances that (1) the multicast link ML successfully transmits the first original audio data $OA1x$ to the primary communication unit R1 (that is, the primary communication unit R1 successfully receives the packet including the first original audio data $OA1x$) and (2) the second original audio data OA2x cannot be transmitted to the secondary communication unit R2 from the audio source S (that is, the secondary communication unit R2 fails to receive the packet including the second original audio data OA2x), FIGS. 9A to 9C illustrate three stages of a synchronous dropping mechanism according to which the primary communication unit R1 and the secondary communication unit R2 (the first audio output unit and the second audio output unit) operate.

In step (a) as indicated in FIG. 9A, the primary communication unit R1 firstly replies an acknowledge (ACK) message to the audio source S, and the secondary communication unit R2 detects the ACK message. Meanwhile, the secondary communication unit R2 fails to receive the second original audio data OA2x, and the secondary communication unit R2 is set to output the second concealment audio data CA2x at the time point tx. In step (b) as indicated in FIG. 9B, the ACK message transmitted by the primary communication unit R1 triggers the secondary communication unit R2 to transmit an NAK message to the primary communication unit R1. In step (c) as indicated in FIG. 9C, the NAK message causes the primary communication unit R1 to drop the received first original audio data OA1x, and to output and play the first concealment audio data CA1x at the time point tx.

Figure 10A:
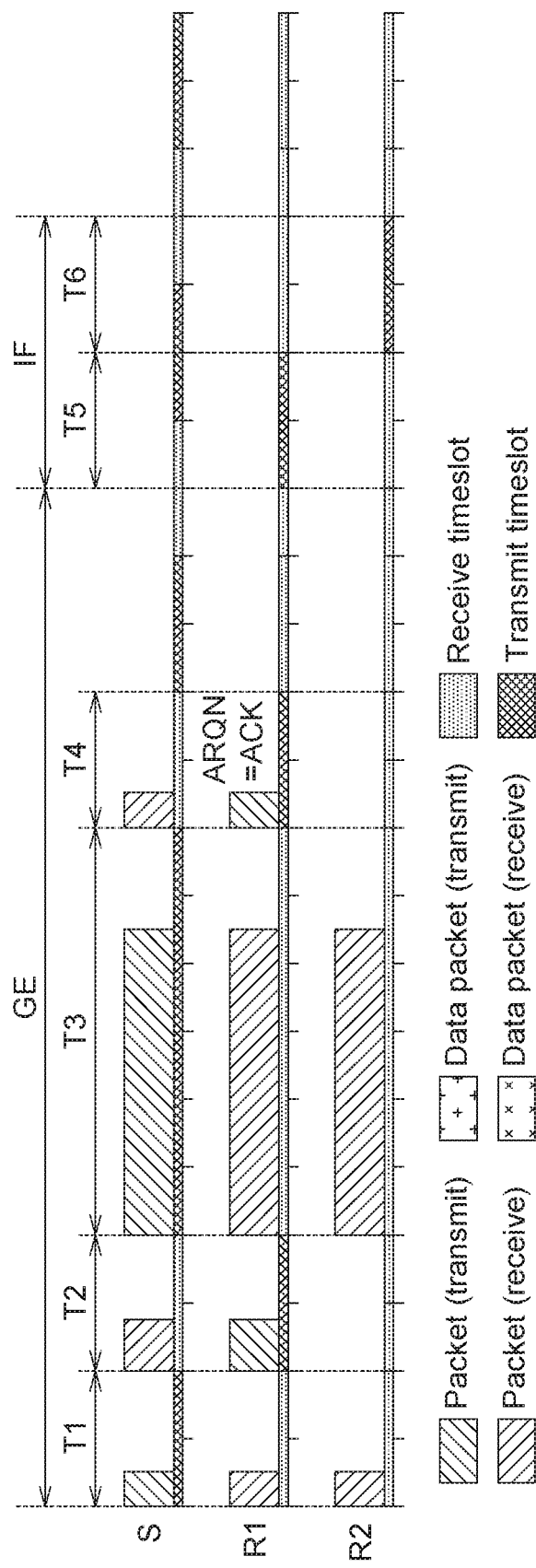
FIGS. 10A to 10B are timing diagrams of the transmission and reception of packets between two audio output units of FIGS. 9A to 9C according to an embodiment of the present disclosure.
Figure 10B:
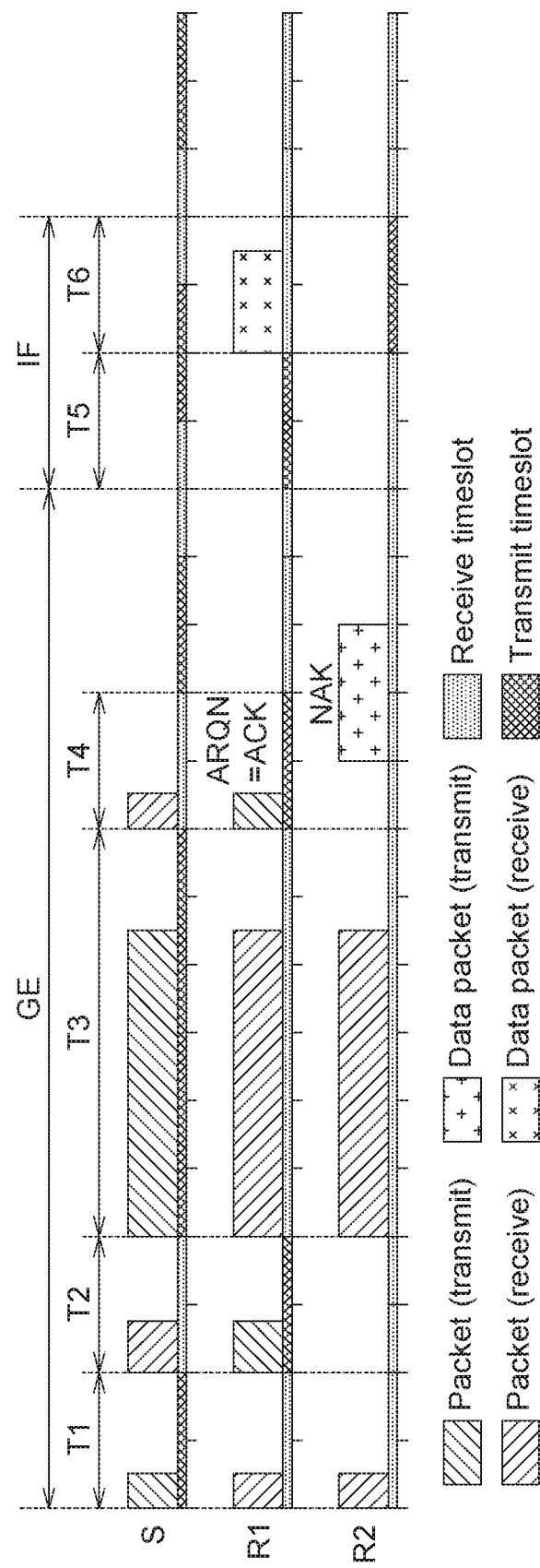

FIGS. 10A to 10B are timing diagrams of the transmission and reception of packets between the primary communication unit R1 and the secondary communication unit R2 (the first audio output unit and the second audio output unit) of FIGS. 9A to 9C according to an embodiment of the present disclosure.

When the multicast link fails to transmit the second original audio data OA2x to the secondary communication unit R2 (the second audio output unit) from the audio source S, FIG. 10A, corresponding to the step of FIG. 9A, is a timing diagram of the transmission and reception of packets. As indicated in FIG. 10A, the primary communication unit R1 replies an ACK message to the audio source S in the ARQN message transmitted in period T4 of FIG. 6, and the ARQN message detected by the secondary communication unit R2 is the ACK message.

FIG. 10B, corresponding to the step of FIG. 9B, is a timing diagram of the transmission and reception of packets. As indicated in FIG. 10B, when the ARQN message detected by the secondary communication unit R2 is the ACK message, the secondary communication unit R2 is triggered to transmit an NAK message to the primary communication unit R1 in a second half of a time slot during which the ARQN message is transmitted.

As indicated in FIG. 10B, the secondary communication unit R2 transmits the NAK message to the primary communication unit R1 in the second half of the time slot during which the ARQN message is transmitted, wherein the second half refers to a time period between the middle and the end of the time slot during which the ARQN message is transmitted). The multicast link (complying with a Bluetooth protocol) defines a reception time slot (for example, the period T4 in FIG. 10B) of an audio source and a non-listening time slot of the audio source. The non-listening time slot, for example, is a time slot whose initial time is at the middle of the period T4 in FIG. 10B. Within the reception time slot of the audio source, the audio source can receive a flag message (including the ARQN message, for example) from the primary communication unit R1. The flag message from the primary communication unit R1 can include an ACK message or an NAK message. Within the non-listening time slot of the audio source, a predetermined packet is exchanged between the primary communication unit R1 and the secondary communication unit R2. A transmission initial time of the predetermined packet is not aligned with an initial time of the reception time slot of the audio source. For example, the transmission initial time of the predetermined packet is at the middle of the reception time slot of the audio source. In the present embodiment as shown in FIG. 10A, the transmission initial time of the predetermined packet is at the middle of the period T4. The predetermined packet can include an NAK message of the secondary communication unit R2. Since the secondary communication unit R2 transmits the NAK message in the second half of the time slot of the flag message (i.e. the second half of the period T4) and the initial time of the NAK message in period T4 is aligned with the middle point of period T4 (not aligned with the starting point of the period T4), the audio source S will ignore the NAK message to avoid that the audio source S erroneously receives the NAK message from the secondary communication unit R2.

Figure 11:
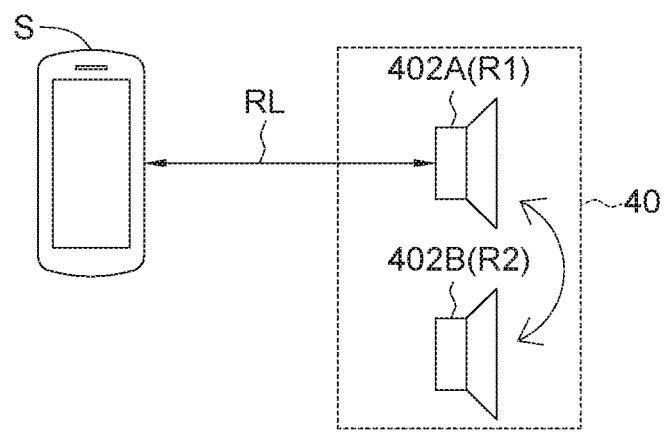
FIG. 11 is a schematic diagram of a wireless audio output device whose two audio output units are equipped with a synchronous dropping mechanism according to another embodiment of the present disclosure.

Referring to FIG. 11, a schematic diagram of a wireless audio output device 40 whose two audio output units are equipped with a synchronous dropping mechanism according to another embodiment of the present disclosure is shown. The wireless audio output device 40 can establish a wireless signal relay link (RL) with an audio source S. The audio source S simultaneously outputs a first original audio data OA1x and a second original audio data OA2x to a user for listening at the time point tx. The wireless audio output device 40 includes a first audio output unit 402A and a second audio output unit 402B. The first audio output unit 402A is set as a primary communication unit R1, and the second audio output unit 402B is set as a secondary communication unit R2. The primary communication unit R1 is configured to establish a relay link RL with the audio source S. Over the relay link RL, the primary communication unit R1 performs bi-directional communication with the audio source, and the secondary communication unit R2 indirectly receives the second original audio data OA2x. The second original audio data OA2x is firstly transmitted to the primary communication unit R1 from the audio source S and then is further transmitted to the secondary communication unit R2 from the primary communication unit R1. Over the wireless signal relay link RL, (1) the primary communication unit R1 can receive the first original audio data OA1x and the second original audio data OA2x from the audio source 5, (2) the primary communication unit R1 can further transmit the second original audio data OA2x to the secondary communication unit R2, and (3) the secondary communication unit R2 can notify the primary communication unit R1 of whether the second original audio data OA2x is successfully received.

Figure 12A:
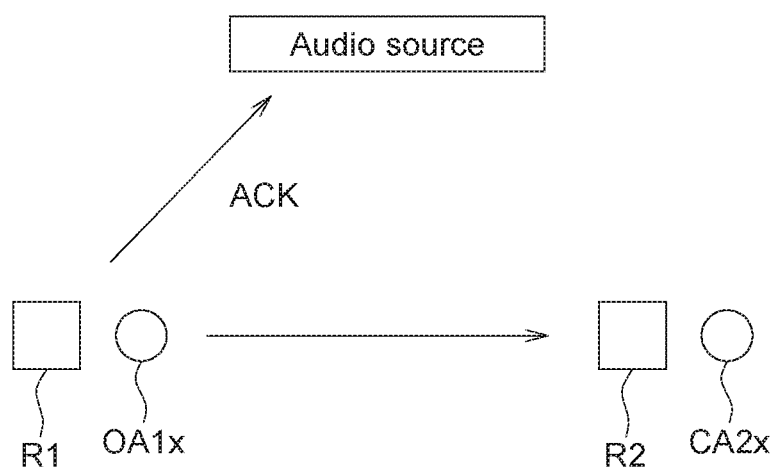
FIGS. 12A to 12C are schematic diagrams of the third scenario of the two audio output units of FIG. 11 operating a synchronous dropping mechanism according to an embodiment of the present disclosure.
Figure 12B:
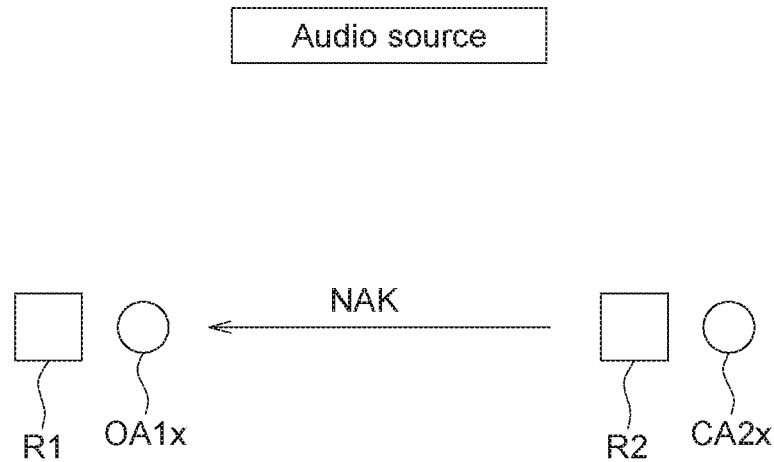
Figure 12C:
Figure 12C:
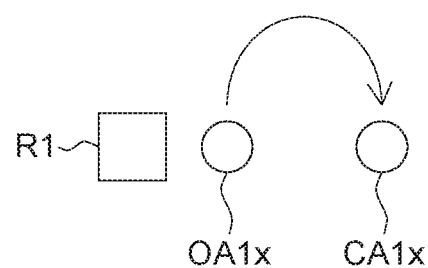

Referring to FIGS. 12A to 12C, schematic diagrams of the third scenario of the two audio output units of FIG. 11 operating a synchronous dropping mechanism according to an embodiment of the present disclosure are shown. According to the embodiment as indicated in FIG. 11, when (1) the relay link RL successfully transmits the first original audio data OA1x to the primary communication unit R1 from the audio source S but (2) the relay link RL fails to successfully transmit the second original audio data OA2x to the secondary communication unit R2 (the second audio output unit), FIGS. 12A to 12C illustrate three stages of a synchronous dropping mechanism according to which the primary communication unit R1 and the secondary communication unit R2 (the first audio output unit and the second audio output unit) operate.

In step (a) as indicated in FIG. 12A, the primary communication unit R1 firstly replies an acknowledge (ACK)

message to the audio source S, and the secondary communication unit R2 detects the ACK message. At this time, the primary communication unit R1 is set to output and play the first original audio data OA1x at the time point tx. In step (b) as indicated in FIG. 12B, the ACK message triggers the secondary communication unit R2 to transmit an NAK message to the primary communication unit R1. Since the secondary communication unit R2 fails to receive the second original audio data OA2x, the second concealment audio data CA2x is set to be outputted and played at the time point tx. In step (c) as indicated in FIG. 12C, the NAK message triggers the primary communication unit R1 to drop the received first original audio data OA1x, and the first concealment audio data CA1x is outputted and played at the time point tx.

The wireless audio output device disclosed in the above embodiments of the present disclosure can support the Bluetooth device whose audio source S provides a multicast link, and the present disclosure is implemented under the scenario that the audio source S only establishes a bi-directional link with the first audio output unit R1 and a unidirectional link is established between the audio source S and the second audio output unit R2. That is, the wireless audio output device of the present disclosure is adapted to the standard Bluetooth 3.0 wireless headphone, in which only one of the left-ear headphone and the right-ear headphone establishes bi-directional Bluetooth connection with the audio source. In other words, without changing the original operation mode of the audio source, the wireless audio output device of the present disclosure can be used in a compactible manner. Besides, since the audio output units of the wireless audio output device of the present disclosure are equipped with the same synchronous dropping mechanism, the concealment audio data can simultaneously replace the original audio data, the voice received through the left-ear headphone and the voice received through the right-ear headphone are very similar, and the listener will have a better subjective auditory perception.

On the other hand, the present disclosure can also be implemented under the scenario that the audio source S establishes an independent wireless signal link with the first audio output unit R1 and establishes an independent wireless signal link with the second audio output unit R2, respectively. For example, the wireless audio output device of the present disclosure is adapted to the wireless headphone complying with the Bluetooth low energy (BLE) standard. Both the left-ear headphone and the right-ear headphone of the BLE wireless headphone can establish a bi-directional wireless signal link with the audio source S. That is, the first BLE wireless link (BLE link 1) and the second BLE wireless link (BLE link 2) are independent of each other, and a wireless signal link IFL is established between the first audio output unit R1 and the second audio output unit R2. The first audio output unit R1 can receive a first original audio data OA1x over the first BLE wireless link BLE link 1. The second audio output unit R2 can receive a second original audio data OA2x over the second BLE wireless link BLE link 2. Over a wireless signal link IFL, the first audio output unit R1 functions to determine whether the first original audio data OA1x is successfully received. Also, over the wireless signal link IFL, the second audio output unit R2 functions to determine whether the second original audio data OA2x is successfully received. Further, the determinations are exchanged between the first and second audio output units R1 and R2.

Thus, when at least one of condition (1) that the first BLE wireless link (BLE link 1) cannot successfully transmit the first original audio data OA1x to the first audio output unit R1 and condition (2) that the second BLE wireless link (BLE link 2) cannot successfully transmit the second original audio data OA2x to the second audio output unit R2 is met, the first audio output unit R1 and the second audio output unit R2 generate a first concealment audio data CA1x and a second concealment audio data CA2x, respectively, by using the PLC algorithm and the first audio output unit R1 and the second audio output unit R2 play the first concealment audio data CA1x and the second concealment audio data CA2x, respectively.

It is given that the conventional wireless audio output device (such as a pair of wireless Bluetooth headphones) is used in a speech scenario where the vocal fundamental frequency changes greatly. When the first audio output unit (such as left-ear headphone) fails to receive the original audio data but the second audio output unit (such as right-ear headphone) successfully receives the original audio data, a significant difference exists between (1) the concealment audio data outputted from the first audio output unit and (2) the original audio data outputted from the second audio output unit. The significant difference will result in significant imbalance between the left-ear audio and the right-ear audio. The imbalance will be noticeable to the user or may even become a noise to the user and greatly deteriorate the user's subjective auditory perception. According to the wireless audio output device and the audio concealment method disclosed in the embodiments of the present disclosure, when one of the audio output units fails to receive the original audio data, the first audio output unit and the second audio output unit generate a first concealment audio data and a second concealment audio data, respectively, by using a PLC algorithm, and play the first concealment audio data and the second concealment audio data, respectively. Since the first concealment audio data and the second concealment audio data are similar to each other, the audio received by the user's left ear and right ear will be balanced and will not generate noises. Thus, the user's subjective auditory perception will be improved.

While the invention has been described by way of example and in terms of the preferred embodiment (s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A wireless audio output device capable of creating a wireless signal link with an audio source, wherein the wireless audio output device comprises:

a first audio output unit configured to receive and play a first original audio data over the wireless signal link, wherein the audio source outputs the first original audio data and a second original audio data, the first original audio data and the second original audio data are set to be outputted simultaneously;

a second audio output unit configured to receive and play the second original audio data over the wireless signal link;

wherein the first audio output unit and the second audio output unit determine whether the first original audio data and the second original audio data are successfully received by the first audio output unit and the second audio output unit, respectively, and the first audio output unit and the second audio output unit exchange the results of determination, wherein when the first original audio data cannot be successfully received by the first audio output unit and the second original audio data is successfully received by the second audio output unit, the first audio output unit generates and plays a first concealment audio data and the second audio output unit drops the successfully received second original audio data and generates and plays the second concealment audio data.

2. The wireless audio output device according to claim 1, wherein the wireless signal link is a multicast link, the first audio output unit is set as a primary communication unit, and the second audio output unit is set as a secondary communication unit, the primary communication unit is configured to establish a multicast link with the audio source and perform bi-directional communication with the audio source over the multicast link, the secondary communication unit performs unidirectional communication with the audio source over the multicast link, and performs bi-directional communication with the primary communication unit.

3. The wireless audio output device according to claim 2, wherein when the multicast link successfully transmits the second original audio data but fails to transmit the first original audio data, the primary communication unit replies a non-acknowledge (NAK) message to the audio source, the NAK message triggers the secondary communication unit to drop the received second original audio data and output the second concealment audio data.

4. The wireless audio output device according to claim 2, wherein when the multicast link successfully transmits the first original audio data but fails to transmit the second original audio data, the primary communication unit firstly replies an acknowledge (ACK) message to the audio source, wherein the ACK message triggers the secondary communication unit to output an NAK message to the primary communication unit, such that the primary communication unit drops the received first original audio data and outputs the first concealment audio data.

5. The wireless audio output device according to claim 4, wherein the multicast link defines a reception time slot of the audio source, and wherein the audio source receives a message from the primary communication unit during the reception time slot of the audio source, a transmission initial time of the NAK message not aligned with an initial time of the reception time slot of the audio source.

6. The wireless audio output device according to claim 5, wherein the transmission initial time of the NAK message is in a second half of the reception time slot of the audio source.

7. The wireless audio output device according to claim 2, wherein the multicast link complies with a Bluetooth protocol, and the Bluetooth protocol defines an reception time slot of the audio source and an non-listening time slot of the audio source, wherein the audio source receives a flag message from the primary communication unit within the reception time slot of the audio source, wherein a predetermined packet is exchanged between the primary communication unit and the secondary communication unit within the non-listening time slot of the audio source, and a transmission initial time of the predetermined packet is not aligned with an initial time of the reception time slot of the audio source.

8. The wireless audio output device according to claim 7, wherein the non-listening time slot of the audio source includes a flag message, and the primary communication unit transits an NAK message to the secondary communication unit by using the flag message.

9. The wireless audio output device according to claim 7, wherein the non-listening time slot of the audio source includes a second half time slot of the flag message, and the secondary communication unit transmits an NAK message to the primary communication unit by using the second half time slot of the flag message.

10. The wireless audio output device according to claim 1, wherein the wireless signal link is a relay link, the first audio output unit is set as a primary communication unit, and the second audio output unit is set as a secondary communication unit, the primary communication unit is configured to establish the relay link with the audio source and perform bi-directional communication with the audio source over the relay link, and the secondary communication unit is configured to be added to the relay link, wherein the second original audio data is firstly transmitted to the primary communication unit from the audio source over the relay link and then is transmitted to the secondary communication unit from the primary communication unit.

11. The wireless audio output device according to claim 10, wherein when the primary communication unit successfully receives the first original audio data but the second original audio data cannot be successfully transmitted to the secondary communication unit, the primary communication unit firstly replies an ACK message to the audio source, and the ACK message triggers the secondary communication unit to output an NAK message to the primary communication unit, such that the primary communication unit drops the received first original audio data and outputs the first concealment audio data.

12. The wireless audio output device according to claim 1, wherein when the first original audio data and the second original audio data both are successfully received, the first audio output unit and the second audio output unit play the first original audio data and the second original audio data, respectively.

13. The wireless audio output device according to claim 1, wherein the wireless signal link includes a first wireless link and a second wireless link, the first wireless link and the second wireless link are independent of each other, and the wireless signal link is established between the first audio output unit and the second audio output unit,
wherein the first audio output unit receives the first original audio data over the first wireless link, and the second audio output unit receives the second original audio data over the second wireless link,
wherein the first audio output unit and the second audio output unit determine whether the first original audio data and the second original audio data are successfully received, respectively, and the first audio output unit and the second audio output unit exchange the results of determination over the wireless signal link.

14. The wireless audio output device according to claim 13, wherein the first wireless link and the second wireless link both are a low-power Bluetooth connection.

15. An audio concealment method adaptable to a wireless audio output device, the audio concealment method comprising:
(a) when a first original audio data is successfully received by a first audio output unit of the wireless audio output device and a second original audio data is successfully received by a second audio output unit of the wireless audio output device, playing the first original audio data and the second original audio data by the first audio output unit and the second audio output unit, respectively, wherein the first original audio data and the second original audio data are outputted from an audio source, wherein the wireless audio output device is configured to establish a wireless signal link with the audio source, wherein the first original audio data and the second original audio data are set to be outputted simultaneously, wherein the first audio output unit is configured to receive and play the first original audio data over the wireless signal link, and the second audio output unit is configured to receive and play the second original audio data over the wireless signal link, and wherein the first audio output unit and the second audio output unit determine whether the first original audio data and the second original audio data are successfully received, respectively, and the first audio output unit and the second audio output unit exchange the results of determination;

(b) when the first original audio data cannot be successfully received by the first audio output unit and the second original audio data is successfully received by the second audio output unit, the first audio output unit generates and plays a first concealment audio data and the second audio output unit drops the successfully received second original audio data and generates and plays the second concealment audio data.

16. The audio concealment method according to claim 15, wherein the wireless signal link is a multicast link, the first audio output unit performs bi-directional communication with the audio source, and the second audio output unit performs unidirectional communication with the audio source and performs bi-directional communication with the first audio output unit, wherein when the multicast link successfully transmits the second original audio data but fails to transmit the first original audio data, the first audio output unit replies an NAK message to the audio source, and the NAK message triggers the second audio output unit to drop the received second original audio data and output the second concealment audio data.

17. The audio concealment method according to claim 15, wherein the wireless signal link is a multicast link, the first audio output unit performs bi-directional communication with the audio source, and the second audio output unit performs unidirectional communication with the audio source and performs bi-directional communication with the first audio output unit, wherein when the multicast link successfully transmits the first original audio data but the second original audio data cannot be transmitted successfully, the first audio output unit firstly replies an ACK message to the audio source, and the ACK message further triggers the second audio output unit to transmit an NAK message to the first audio output unit, such that the first audio output unit drops the received first original audio data and outputs the first concealment audio data.

18. The audio concealment method according to claim 15, wherein the wireless signal link includes a first wireless link and a second wireless link, the first wireless link and the second wireless link are independent of each other, and the wireless signal link is established between the first audio output unit and the second audio output unit, wherein the first audio output unit receives the first original audio data over the first wireless link, and the second audio output unit receives the second original audio data over the second wireless link, wherein the first audio output unit and the second audio output unit determine whether the first original audio data and the second original audio data are successfully received, respectively, and the first audio output unit and the second audio output unit exchange the results of determination.

19. The audio concealment method according to claim 18, wherein the first wireless link and the second wireless link both are a low-power Bluetooth connection.

* * * * *